(12) United States Patent
Schultes et al.

(10) Patent No.: US 9,410,043 B2
(45) Date of Patent: Aug. 9, 2016

(54) REACTIVE MIXTURE FOR COATING MOLDED OBJECTS BY MEANS OF REACTION INJECTION MOLDING AND COATED MOLDED OBJECT

(75) Inventors: Klaus Schultes, Wiesbaden (DE); Thorsten Goldacker, Roβdorf (DE); Klaus Koralewski, Riedstadt (DE); Werner Höβ, Shanghai (CN); Ghirmay Seyoum, Egelsbach (DE); Elevtherios Gross, Frankfurt (DE); Erwin Felger, Ober-Ramstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 39 days.

(21) Appl. No.: 13/546,051

(22) Filed: Jul. 11, 2012

(65) Prior Publication Data

US 2013/0001825 A1    Jan. 3, 2013

Related U.S. Application Data

(62) Division of application No. 12/601,852, filed as application No. PCT/EP2008/054678 on Apr. 17, 2008, now abandoned.

(30) Foreign Application Priority Data

Jun. 19, 2007   (DE) .......................... 10 2007 028 601

(51) Int. Cl.
*C09D 4/00* (2006.01)
*C08F 4/32* (2006.01)
(Continued)

(52) U.S. Cl.
CPC .............. *C09D 4/00* (2013.01); *B29C 45/1679* (2013.01); *C08F 2/46* (2013.01); *C08F 4/32* (2013.01);
(Continued)

(58) Field of Classification Search
CPC ............... B29C 45/1679; C09D 4/00

USPC ......................................................... 264/255
See application file for complete search history.

(56) References Cited

U.S. PATENT DOCUMENTS 3,759,808 A * 9/1973 Parker ............................ 522/13
3,968,305 A * 7/1976 Oshima et al. ................ 428/334
(Continued)

FOREIGN PATENT DOCUMENTS

| CN | 1741886 A | | 3/2006 |
| JP | 2003-019731 | * | 1/2003 |
| WO | WO 2004/048076 | | 6/2004 |

OTHER PUBLICATIONS

Kenji, JP2003-019731, machine translation.*
(Continued)

*Primary Examiner* — Larry Thrower
(74) *Attorney, Agent, or Firm* — Oblon, McClelland, Maier & Neustadt, L.L.P.

(57) ABSTRACT

A reactive mixture for coating mouldings by means of reaction injection moulding, containing at least 40% by weight of (meth)acrylates having at least two double bonds. The reactive mixture contains at least one photoinitiator and at least one thermal initiator. The present invention furthermore describes a coated moulding including a moulding which is obtainable by injection moulding processes and includes at least one polymer selected from polymethyl methacrylate, polymethylmethacrylimide, styrene-acrylonitrile copolymer, styrene-maleic acid copolymer and polymethyl methacrylate copolymers, and a coating which is obtainable by polymerization of (meth)acrylates having at least two double bonds. The coating has an adhesive strength rating of not more than 1 according to the cross hatch test and a decrease in gloss at 20° after a scratch resistance test according to ASTM 1044 (12/05) (applied weight 500 g, number of cycles=100) of not more than 10%.

25 Claims, 1 Drawing Sheet

(51) Int. Cl.
*C08F 2/46* (2006.01)
*B29C 45/16* (2006.01)
*B29C 45/00* (2006.01)

(52) U.S. Cl.
CPC .......... *B29C 45/0001* (2013.01); *Y10T 428/263* (2015.01); *Y10T 428/264* (2015.01); *Y10T 428/31721* (2015.04); *Y10T 428/31913* (2015.04); *Y10T 428/31924* (2015.04); *Y10T 428/31928* (2015.04)

(56) References Cited

U.S. PATENT DOCUMENTS 4,222,835 A * 9/1980 Dixon ............................. 522/13
4,604,295 A * 8/1986 Humphreys .................. 427/519
6,716,891 B1 4/2004 Meisenburg

OTHER PUBLICATIONS

Combined Office Action and Search Report issued Jul. 11, 2013 in Chinese Patent Application No. 200880020611.5 with English language translation.
Office Action issued May 25, 2015 in Chinese Patent Application No. 200880020611.5 (with English language translation).
Office Action dated Nov. 18, 2015, in European Patent Application No. 08 736 336.2 (with English Translation).
Jose Ulissses Jansen et al.: "A new resin for photocurable insulating varnishes", Nuclear Instruments and Methods in Physics Research B, No. 236, May 17, 2005, pp. 546-551.

* cited by examiner

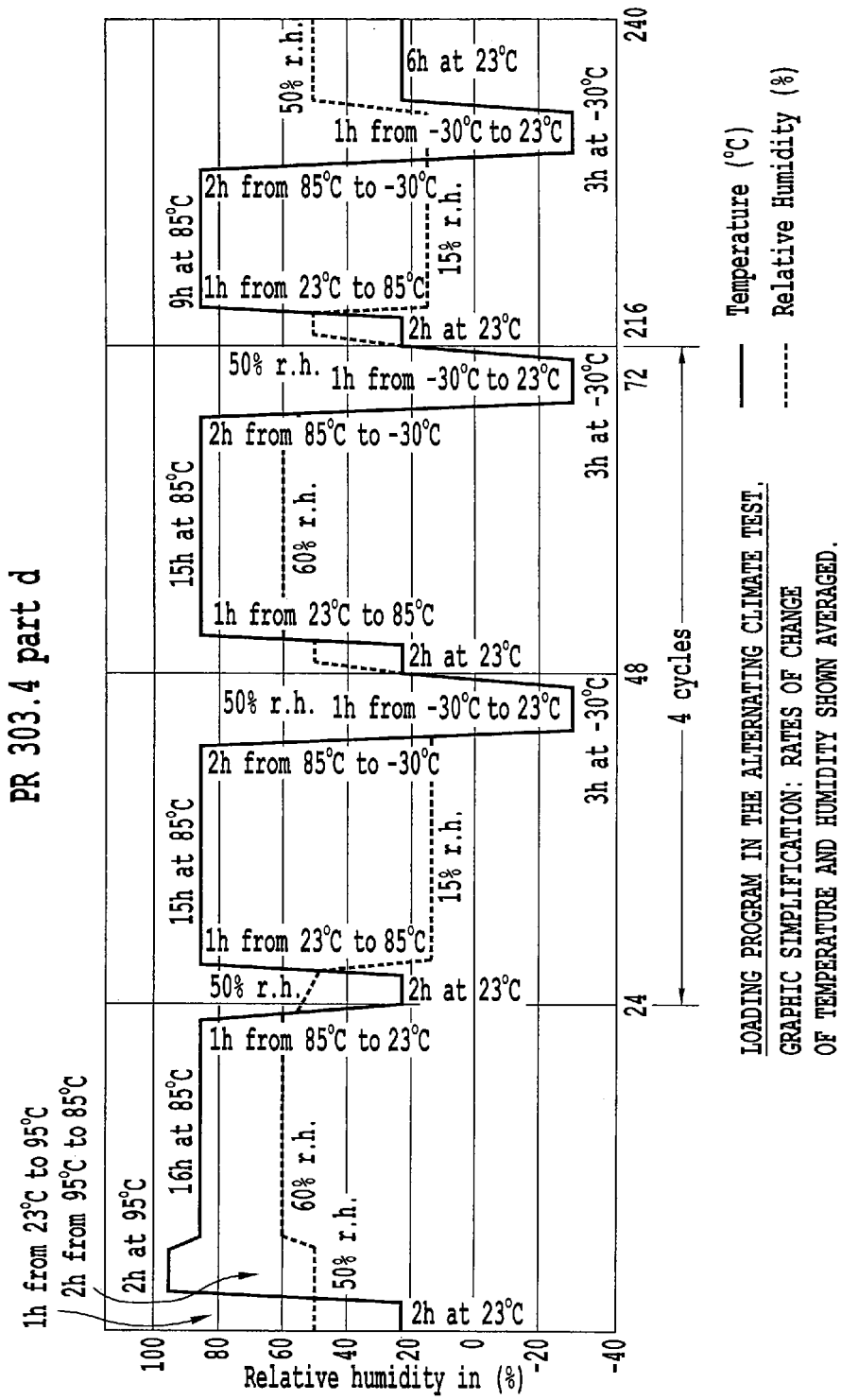

REACTIVE MIXTURE FOR COATING MOLDED OBJECTS BY MEANS OF REACTION INJECTION MOLDING AND COATED MOLDED OBJECT

This application is a divisional of U.S. 12/601,852 filed Nov. 25, 2009, abandoned, which was a National Stage of PCT/EP2008/054678 filed Apr. 17, 2008.

The present invention relates to a reactive mixture for coating mouldings by means of reaction injection moulding. Furthermore, the present invention describes a coated moulding.

Thermoplastic moulding materials which may be based, for example, on polymethyl methacrylate (PMMA) are used for a very wide range of applications. For this purpose, the materials are extruded or injection moulded to give shaped articles.

The shaped articles are widely used nowadays for the production of parts subjected to high stress, such as, for example, displaceable parts (interior and exterior of automobiles, coverings of electronic devices, such as mobile phone, computer, organizer, MP3 player or television coverings), opaque coloured add-on parts (e.g. in the automotive industry: exterior mirrors, pillar claddings, mirror triangles) or opaque coloured commodity articles. Owing to the high stress, the surface of the shaped articles thus used tends to form scratches, which are often visually unacceptable. Mouldings which were produced by injection moulding are particularly scratch-sensitive in this respect. Furthermore, from economic points of view, the colour of the mouldings produced can be varied only with very great difficulty, in order thus to permit simple colour matching of the add-on part with the respective automobile, for example during production.

For improving the scratch resistance and for colour matching, the mouldings described above can be provided with finish coats. However, the classical application of reactive finishes is relatively complicated and therefore expensive. These processes are scarcely suitable for the production of mass-produced articles.

For this reason, processes by means of which a scratch-resistant layer can be applied to the mouldings relatively economically by means of injection moulding processes have already been developed. For example, the publications JP 11300776 and JP 2005074896 describe injection moulding processes in which a moulding having a scratch-resistant layer is obtained.

The publication JP 11300776 (Dainippon Toryo, 1998) describes a two-stage RIM process. First, a moulding is obtained by metathesis RIM of dicyclopentadiene. After the curing, the movable part of the RIM mould is retracted so that a defined gap forms between moulding and mould. A coating material which consists of acrylate-functionalized urethane oligomers, styrene, diacrylate crosslinking agents and optionally fillers and pigments (TiO$_2$, talc) and is cured by a free radical method at 95° C. for 2 min is injected into this gap in a second RIM process.

The document JP 2005074896 (Toyota Motor Corp.; Dainippon Toryo Co.) likewise describes an RIM process. In a first conventional injection moulding step, a plastic, in particular polycarbonate (PC), is processed to give a sheet-like shaped article. The mould then opens to form a small gap and, within a few seconds, a reactive solution of acrylate-functionalized urethane oligomers, acrylate crosslinking agents, inhibitors and an organic peroxide initiator is injected and cured. At 95° C., the curing is complete after a few seconds and the composite body is removed from the mould after 90 s. It has good scratch resistance, adhesion of the composite, thermal shock resistance and resistance to warm water cycling. The presence of a urethane oligomer which is composed of isophorone diisocyanate or bis(isocyanocyclohexyl)methane building blocks is essential in all claims.

The mouldings described above already have good properties. However, attempts are continuously being made to improve the scratch resistance of mouldings thus obtained. Furthermore, the production is time-consuming so that the overall process is expensive. In addition, the stability of the mouldings to weathering is in need of improvement. Premature polymerization of the reactive mixture in the injection moulding apparatus presents a further problem of the injection moulding process described in publications JP 11300776 and JP 2005074896, so that short cycle times are scarcely achievable by these processes in mass production.

In view of the prior art, it was the object of the present invention to provide a reactive mixture for coating mouldings by means of a reaction injection moulding, which mixture leads to a coating having particularly high scratch resistance and high adhesive strength on a moulding.

A further object of the invention was to provide a reactive mixture which can be completely cured particularly easily and in a short time.

In addition, it was an object of the present invention to provide processes for the production of coated mouldings which can be carried out easily and economically. The moulding should be obtained thereby with cycle times as short as possible and, as a whole, with little energy consumption.

The provision of mouldings having outstanding mechanical properties was furthermore an object of the present invention. In particular, the mouldings should show a high scratch resistance and great hardness. Moreover, the coated mouldings should have high resistance to weathering and to chemicals.

These objects and further objects which are not explicitly mentioned but can be derived or deduced directly from the relationships discussed here at the outset are achieved by a reactive mixture having all features of patent claim 1. Modifications of the reactive mixture according to the invention are protected in the dependent claims relating back to claim 1. With regard to the process and the moulding, claims 18 and 27 provide achievements of the underlying object.

The present invention accordingly relates to a reactive mixture for coating mouldings by means of reaction injection moulding, comprising at least 40% by weight of (meth)acrylates having at least two double bonds, which is characterized in that the reactive mixture comprises at least one photoinitiator and at least one thermal initiator.

It is possible thereby in an unforeseeable manner to provide a coated moulding which has outstanding scratch resistance and can be obtained very economically. Surprisingly, the coating shows a very high adhesive strength in the moulding. In addition, the coatings obtained with the reactive mixture according to the invention show high stability to weathering. Furthermore, the coated mouldings have good mechanical properties and may exhibit both particularly great hardness and good impact strength.

Furthermore, the reactive mixture according to the invention permits the production of a coating resistant to chemicals and to heat on a moulding.

Moreover, the reactive mixture may have additives in order to adapt the desired properties to specific requirements. Thus, colour matching of the moulding may be effected in a simple manner.

Furthermore, the process according to the invention can be carried out easily and economically, it being possible to obtain the moulding with surprisingly short cycle times and, as a whole, with little energy consumption.

The reactive mixture according to the invention has at least 40% by weight, preferably at least 60% by weight and particularly preferably at least 90% by weight of (meth)acrylates having at least two double bonds, based on the total weight of the reactive mixture. The term "double bond" designates in particular carbon-carbon double bonds which are capable of free radical polymerization. The expression "(meth)acrylate" represents acrylate, methacrylate and mixtures of the two. (Meth)acrylates having at least two double bonds are also known as crosslinking monomers. These include in particular (meth)acrylates having two double bonds such as, for example, (meth)acrylates which are derived from unsaturated alcohols, such as, for example, 2-propynyl (meth)acrylate, allyl (meth)acrylate or vinyl (meth)acrylate, and (meth)acrylates which are derived from diols or higher hydric alcohols, such as, for example, glycol di(meth)acrylates, such as ethylene glycol di(meth)acrylate, diethylene glycol di(meth)acrylate, triethylene glycol di(meth)acrylate, tetra- and polyethylene glycol di(meth)acrylate, 1,3-butane-diol (meth)acrylate, 1,4-butanediol (meth)acrylate, 1,6-hexanediol di(meth)acrylate, glyceryl di(meth)-acrylate and diurethane dimethacrylate; (meth)acrylates having three or more double bonds, such as, for example, glyceryl tri(meth)acrylate, trimethylolpropane tri(meth)acrylate, pentaerythrityl tetra(meth)acrylate and dipentaerythrityl penta(meth)acrylate. Particularly preferred (meth)acrylates having at least two double bonds are in particular 1,6-hexanediol diacrylate, trimethylolpropane triacrylate, pentaerythrityl tetra-acrylate and dipentaerythrityl pentaacrylate.

According to a particular modification, the reactive mixture may comprise at least one (meth)acrylate having three or more double bonds. Preferably, the proportion of (meth)acrylates having three or more double bonds is at least 10% by weight, particularly preferably at least 25% by weight, especially preferably at least 50% by weight and very particularly preferably at least 90% by weight, based on the weight of the reactive mixture.

Reactive mixtures which comprise not more than 90% by weight, particularly preferably not more than 75% by weight, especially preferably not more than 50% by weight and very particularly preferably not more than 7% by weight of monomers having two or less double bonds are furthermore of particular interest.

According to a particular embodiment, the reactive mixture preferably comprise 1,6-hexanediol diacrylate, trimethylolpropane triacrylate and/or pentaerythrityl tetraacrylate. In particular, reactive mixtures which comprise trimethylolpropane triacrylate and penta-erythrityl tetraacrylate are of particular interest, it being possible for the weight ratio of trimethylol-propane triacrylate to pentaerythrityl tetraacrylate to be preferably in the range of 10:1 to 1:10, preferably in the range of 5:1 to 1:5, particularly preferably in the range of 3:1 to 1:3 and very particularly preferably in the range of 2:1 to 1:2.

According to a further development, the reactive mixture preferably comprises trimethylolpropane triacrylate and 1,6-hexanediol diacrylate, it being possible for the weight ratio of trimethylolpropane triacrylate to 1,6-hexanediol diacrylate preferably to be in the range of 10:1 to 1:10, preferably in the range of 5:1 to 1:5, particularly preferably in the range of 3:1 to 1:3 and very particularly preferably in the range of 2:1 to 1:2.

Reactive mixtures which preferably comprise pentaerythrityl tetraacrylate and 1,6-hexanediol diacrylate are furthermore of particular interest. Expediently, the weight ratio of pentaerythrityl tetraacrylate to 1,6-hexanediol diacrylate may be in the range of 10:1 to 1:10, preferably in the range of 5:1 to 1:5, particularly preferably in the range of 3:1 to 1:3 and very particularly preferably in the range of 2:1 to 1:2.

Reactive mixtures which comprise pentaerythrityl tetraacrylate and/or trimethylolpropane triacrylate surprisingly show particularly high scratch resistance which increases in particular with the proportion of pentaerythrityl tetraacrylate. Reactive mixtures which comprise 1,6-hexanediol diacrylate and/or trimethylol-propane triacrylate show particularly high UV stability which can be determined in particular by the xenon arc test. Thus, mixtures having a high proportion of 1,6-hexanediol diacrylate retain high scratch resistance according to the abrasive disc test even after xenon arc exposure.

The scratch resistance of the coating is dependent, inter alia, on the number of polymerizable double bonds, based on the weight of the mixture. The higher this proportion, the higher is the scratch resistance which the coating can achieve. Preferably, the reactive mixture can accordingly have at least 1 mol of double bond per 120 g of reactive mixture, particularly preferably at least 1 mol of double bond per 105 g of reactive mixture. The scratch resistance can be increased thereby, in particular by using (meth)acrylates having three or more double bonds.

The reactive mixture can be used in particular in reactive injection moulding processes. Accordingly, the mixture has a viscosity which permits such use. Preferably, the dynamic viscosity of the reactive mixture is in the range of 1 to 200 mPa·s at 25° C., particularly preferably in the range of 5 to 50 mPa·s at 25° C., it being possible to determine the dynamic viscosity according to Brookfield (with UL adaptor).

For curing, the reactive mixture comprises at least one initiator by means of which the monomers can be subjected to free radical polymerization. Thermal initiators which form free radicals by the action of heat or photoinitiators which initiate free radical polymerization on irradiation with electromagnetic waves can be used here. Surprisingly, particular advantages can be achieved by using reactive mixtures which comprise both thermal initiators and photo-initiators. These advantages include in particular short cycle times in the production of the coated mouldings, particularly high stability to weathering, scratch resistance and adhesive strength of the coating.

Suitable thermal initiators are, inter alia, azo compounds, peroxy compounds, persulphate compounds or azoamidines. Nonlimiting examples are dibenzoyl peroxide, dicumene peroxide, cumene hydroperoxide, diisopropyl peroxydicarbonate, bis(4-tert-butylcyclo-hexyl) peroxydicarbonate, dipotassium persulphate, ammonium peroxydisulphate, 2,2'-azobis (2-methylpropio-nitrile) (AIBN), 2,2'-azobis (isobutyramidine) hydro-chloride, benzpinacol, dibenzyl derivatives, methyl ethylene ketone peroxide, 1,1-azobiscyclohexanecarbo-nitrile, methyl ethyl ketone peroxide, acetylacetone peroxide, dilauryl peroxide, didecanoyl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butyl peroxyisopropylcarbonate, 2,5-bis(2-ethyl-hexanoylperoxy)-2,5-dimethylhexane, tert-butyl peroxy-2-ethylhexanoate, tert-butyl peroxy-3,5,5-trimethyl-hexanoate, tert-butyl peroxyisobutyrate, tert-butyl peroxyacetate, dicumyl peroxide, 1,1-bis(tert-butyl-peroxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxy-dicarbonate, and the free radical formers obtainable from DuPont under the name ®Vazo, for example ®Vazo V50 and ®Vazo WS.

Expediently, the reactive mixture may comprise 0.01% by weight to 3% by weight, preferably 0.1% by weight to 2.5% by weight and particularly preferably 0.5% by weight to 1.5% by weight of thermal initiator, based on the weight of the reactive mixture.

The preferred photoinitiators include, inter alia, α,α-diethoxyacetophenone (DEAP, Upjohn Corp.), n-butyl-benzoin ether (®Triganol-14, AKZO) and 2,2-dimethoxy-2-phenylacetophenone (®Irgacure 651) and 1-benzoylcyclohexanol (®Irgacure 184), bis(2,4,6-trimethylbenzoyl)-phenylphospine oxide (®Irgacure 819) and 1-[4-(2-hydroxyethoxy)phenyl]-2-hydroxy-2-phenylpropan-1-one (®Irgacure 2959), which in each case are commercially available from Ciba Geigy Corp.

The proportion of photoinitiator is not critical per se. Preferably, the reactive mixture has 0.01% by weight to 10% by weight, particularly preferably 0.3% by weight to 5% by weight and very particularly preferably 0.7% by weight to 2.3% by weight of photoinitiator, based on the weight of the reactive mixture.

According to a preferred modification, the weight ratio of photoinitiator to thermal initiator may be in the range of 20:1 to 1:5, preferably in the range 15:1 to 1:1 and particularly preferably in the range 10:1 to 2:1.

In addition to the abovementioned constituents, the reactive mixture may comprise a lubricant. Surprisingly, this makes it possible to improve the demouldability of the coated moulding without reducing the adhesive strength to critical values. Accordingly, lubricants, for example selected from the group consisting of the polysiloxanes, the saturated fatty acids having less than $C_{20}$, preferably $C_{16}$ to $C_{18}$, carbon atoms or the saturated fatty alcohols having less than $C_{20}$, preferably $C_{16}$ to $C_{18}$, carbon atoms may be present as auxiliaries. Small proportions of not more than 0.25, e.g. 0.05 to 0.2, % by weight, based on the weight of the reactive mixture, are preferably present. For example, stearic acid, palmitic acid and industrial mixtures of stearic and palmitic acid are suitable. In addition, polysiloxanes which are acrylated, such as, for example, 13/6/αω2-hexylacryloylsiloxane are expedient, it being possible to obtain this compound, for example, under the tradename RC 725 from Goldschmidt GmbH. Polysiloxanes can also be used in large amounts. For example, proportions of not more than 10% by weight, preferably of not more than 1% by weight and very particularly preferably of not more than 0.5% by weight are expedient. For example, n-hexadecanol, n-octadecanol and industrial mixtures of n-hexadecanol and n-octadecanol are furthermore suitable. A particularly preferred lubricant or mould release agent is stearyl alcohol.

Furthermore, the reactive mixture may comprise customary additives, such as colorants, pigments, for example metallic pigments, UV stabilizers, fillers or nanomaterials, in particular ITO nanoparticles. The proportion of these additives is dependent on the intended use and may therefore be within wide ranges. This proportion, if additives are present, may preferably be 0 to 30% by weight, particularly preferably 0.1 to 5% by weight.

The reactive mixture provided by the present invention can be used in particular for coating mouldings by means of reaction injection moulding. Accordingly, the present invention also relates to processes for the production of coated mouldings.

Injection moulding processes have long been known and are widely used. In general, the moulding material is injected into an injection mould and cooled to give a moulding. The moulding thus obtained can then be provided with a coating. For example, the shaped article thus obtained can be finally cooled and removed from the mould. In a second, downstream separate injection moulding step, for example, this preform is then placed in or transferred to another mould having a created cavity and the reactive mixture is injected into the mould and thus injected onto the preform. This process is known as the insert or transfer process. For the subsequently achievable adhesion, it is particularly advantageous if the preformed shaped article is preheated.

According to a preferred embodiment, the coating is advantageously effected in particular by changing the injection mould, a space forming between that surface of the moulding which is to be coated and the inner surface of the injection mould. The resulting space can be filled with a reactive mixture by injection moulding. The reactive mixture can preferably first be thermally cured and, after the thermal curing, cured by irradiation.

By means of this procedure, it is possible to obtain in particular coated mouldings having high scratch resistance, the coating having particularly good adhesive strength. Moreover, particularly short cycle times can also be achieved.

Plants which permit such a procedure are described, inter alia, in the documents JP 11300776 and JP 2005074896 described above.

Moulding materials for the production of the moulding to be coated are known per se, these moulding materials containing thermoplastically processable polymers as an obligatory component. The preferred polymers include, for example, poly(meth)acrylates, in particular polymethyl methacrylate (PMMA), poly(meth)acrylamides, polyacrylonitriles, polystyrenes, polyethers, polyesters, polycarbonates and polyvinyl chlorides. Poly(meth)acrylates and poly(meth)acrylimides are preferred here. These polymers can be used individually or as mixture. Furthermore, these polymers may also be present in the form of copolymers. Preferred copolymers are, inter alia, styrene-acrylonitrile copolymers, styrene-maleic acid copolymers and polymethyl methacrylate copolymers, in particular polymethyl methacrylate-poly(meth)acrylimide copolymers.

Particularly preferred moulding materials have at least 15% by weight, preferably at least 50% by weight and particularly preferably at least 80% by weight of polymethyl methacrylate, polymethylmethacrylimide and/or polymethyl methacrylate copolymers, based on the total weight of the moulding material.

The moulding materials of the present invention can preferably contain poly(meth)acrylates. The expression (meth)acrylates comprises methacrylates and acrylates and mixtures of the two.

Poly(meth)acrylates are polymers which are obtainable by polymerization of a monomer mixture which has at least 60% by weight, preferably at least 80% by weight, of (meth)acrylates, based on the weight of the monomers. These monomers are widely known among those skilled in the art and are commercially available. They include, inter alia, (meth)acrylic acid and (meth)acrylate which are derived from saturated alcohols, such as methyl (meth)acrylate, ethyl (meth)acrylate, propyl (meth)acrylate, butyl (meth)acrylate, pentyl (meth)acrylate, hexyl (meth)acrylate, 2-ethyl-hexyl (meth)acrylate, heptyl (meth)acrylate; (meth)-acrylates which are derived from unsaturated alcohols, such as, for example, oleyl (meth)acrylate, 2-propynyl (meth)acrylate, allyl (meth)acrylate, vinyl (meth)acrylate, etc; amides and nitriles of (meth)acrylic acid, such as N-(3-dimethylaminopropyl)(meth)acrylamide, N-(diethylphosphono)(meth)acrylamide, 1-methacryloylamido-2-methyl-2-propanol; cycloalkyl (meth)acrylates, such as 3-vinylcyclohexyl (meth)acrylate, bornyl (meth)-acrylate; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)-acrylate; glycol di(meth)acrylates, such as 1,4-butanediol (meth)acrylate, (meth)acrylates of ethyl alcohols, such as tetrahydrofurfuryl (meth)acrylate, vinyloxyethoxyethyl (meth)acrylate; and polyfunctional (meth)acrylates, such as trimethylolpropane tri(meth)acrylate.

In addition to the (meth)acrylates described above, further unsaturated monomers which are copolymerizable with the abovementioned methacrylates can also be used for the preparation of the poly(meth)acrylates. In general, these compounds are used in an amount of 0 to 40% by weight, preferably 0 to 20% by weight, based on the weight of the monomers, it being possible to use the comonomers individually or as a mixture.

These include, inter alia, 1-alkenes, such as 1-hexene, 1-heptene; branched alkenes, such as, for example, vinylcyclohexane, 3,3-dimethyl-1-propene, 3-methyl-1-diisobutylene, 4-methyl-1-pentene; vinyl esters, such as vinyl acetate; styrene, substituted styrenes having an alkyl substituent in the side chain, such as, for example, α-methylstyrene and α-ethylstyrene, substituted styrenes having an alkyl substituent on the ring, such as vinyltoluene and p-methylstyrene, halogenated styrenes such as, for example, monochlorostyrenes, dichlorostyrenes, tribromostyrenes and tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinyl-pyrimidine, vinylpiperidine, 9-vinylcarbazole, 3-vinyl-carbazole, 4-vinylcarbazole, 1-vinylimidazole, 2-methyl-1-vinylimidazole, N-vinylpyrrolidone, 2-vinyl-pyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinyl-thiazoles and hydrogenated vintylthiazoles, vinyl-oxazoles and hydrogenated vinyloxazoles; vinyl and isoprenyl ether;

maleic acid derivatives, such as, for example, maleic anhydride, methylmaleic anhydride, maleimide, mehylmaleimide; and dienes, such as, for example, divinylbenzene.

Preferred poly(meth)acrylates are obtainable by polymerization of mixtures which have at least 20% by weight, in particular at least 60% by weight and particularly preferably at least 80% by weight, based in each case on the total weight of the monomers to be polymerized, of methyl methacrylate. In the context of the present invention, these polymers are referred to as polymethyl methacrylates. Preferred moulding materials may contain different poly(meth)acrylates which differ, for example, in the molecular weight or in the monomer composition.

The preparation of the (meth)acrylate homo- and/or copolymers from the monomers described above by the various free radical polymerization processes is known per se. Thus, the polymers can be prepared by mass, solution, suspension or emulsion polymerization. The mass polymerization is described by way of example in Houben-Weyl, volume E20, part 2 (1987), page 1145 et seq. Information regarding the solution polymerization is also to be found there on page 1156 et seq. Explanations of the suspension polymerization technique are also to be found there on page 1149 et seq., while the emulsion polymerization is also elaborated on and explained there on page 1150 et seq.

Furthermore, preferred moulding materials may comprise poly(meth)acrylimides. Poly(meth)acrylimides have repeating units which can be represented by the formula (I)

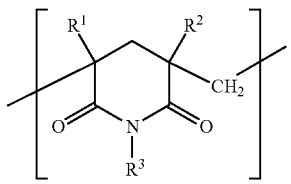

in which $R^1$ and $R^2$ are identical or different and denote hydrogen or a methyl group and $R^3$ denotes hydrogen or an alkyl or aryl radical having up to 20 carbon atoms.

Units of the structure (I) preferably form more than 30% by weight, particularly preferably more than 50% by weight and very particularly preferably more than 80% by weight of the poly(meth)acrylimide.

The preparation of poly(meth)acrylimides is known per se and is disclosed, for example, in British Patent 1 078 425, British Patent 1 045 229, German Patent 1 817 156 (=U.S. Pat. No. 3,627,711) or German Patent 27 26 259 (=U.S. Pat. No. 4,139,685).

In addition, these copolymers may contain further monomer units which arise, for example, from esters of acrylic or methacrylic acid, in particular with lower alcohols having 1-4 carbon atoms, styrene, maleic acid or the anhydride thereof, itaconic acid or the anhydride thereof, vinylpyrrolidone, vinyl chloride or vinylidene chloride. The proportion of the comonomers, which cannot be cyclized or can be cyclized only with very great difficulty, should not exceed 30% by weight, preferably 20% by weight and particularly preferably 10% by weight, based on the weight of the monomers.

Moulding materials which can preferably be used are those which comprise poly(N-methylmethacrylimides) (PMMI) and/or polymethyl methacrylates (PMMA). Poly(N-methylmethacrylimides) (PMMI), polymethyl methacrylates (PMMA) and/or PMMI-PMMA copolymers are preferably copolymers of PMMI and PMMA which are prepared by partial cycloimidization of PMMA. (PMMI which is prepared by partial imidization of PMMA is usually prepared in such a way that not more than 83% of the PMMA used are imidized. The resulting product is referred to as PMMI but strictly speaking is a PMMI-PMMA copolymer.) Both PMMA and PMMI or PMMI-PMMA copolymers are commercially available, for example under the brand name Pleximid from Röhm. An exemplary copolymer (Pleximid 8803) has 33% of MMI units, 54.4% of MMA units, 2.6% of methacrylic acid units and 1.2% of anhydride units. The products and their preparation are known (Hans R. Kricheldorf, Handbook of Polymer Synthesis, Part A, published by Marcel Dekker Inc. New York—Basel—Hong Kong, page 223 et seq.; H. G. Elias, Makromoleküle [Macromolecules], published by Hüthig and Wepf Basel—Heidelberg—New York; U.S. Pat. Nos. 2,146,209 and 4,246,374).

In addition, the moulding materials may comprise styrene-acrylonitrile polymers (SAN). Particularly preferred styrene-acrylonitrile polymers can be obtained by polymerization of mixtures which consist of 70 to 92% by weight of styrene, 8 to 30% by weight of acrylonitrile and 0 to 22% by weight of further comonomers, based in each case on the total weight of the monomers to be polymerized.

For improving the impact strength values, silicone rubber graft copolymers can be mixed with the moulding materials, which graft copolymers are composed of 0.05 to 95% by weight, based on the total weight of the copolymer, of a core a) of an organosilicon polymer which corresponds to the general formula $(R_2SiO_{2/2})_x\cdot(RSiO_{3/2})_y\cdot(SiO_{4/2})_z$ where x=0 to 99.5 mol %, y=0.5 to 100 mol % and z=0 to 50 mol %, R denoting identical or different alkyl or alkenyl radicals having 1 to 6 carbon atoms, aryl radicals or substituted hydrocarbon radicals, 0 to 94.5% by weight, based on the total weight of the copolymer, of a polydialkylsiloxane layer b) and 5 to 95% by weight, based on the total weight of the copolymer, of a shell c) of organic polymer, the core a) comprising vinyl groups prior to grafting and the shell c) being obtainable by free radical polymerization of a mixture which comprises acrylates and methacrylates.

The moulding materials according to the invention can furthermore contain acrylate rubber modifiers. Surprisingly, outstanding impact strength behaviour of the mouldings at room temperature (about 23° C.) which were produced from the moulding materials can be achieved thereby. What is particularly important is that the mechanical and thermal properties, such as, for example, the modulus of elasticity or the Vicat softening temperature, are maintained at a very high level. If an attempt is made to achieve similar notched impact strength behaviour at room temperature only by the use of acrylate rubber modifier or silicone rubber graft copolymer, these values decrease substantially.

Such acrylate rubber modifiers are known per se. They are copolymers which have a core-shell structure, the core and the shell having a high proportion of the (meth)acrylates described above.

Preferred acrylate rubber modifiers here have a structure comprising two shells which differ in their composition.

Particularly preferred acrylate rubber modifiers have, inter alia, the following composition:

Core: Polymer having a proportion of methyl methacrylate of at least 90% by weight, based on the weight of the core.

Shell 1: Polymer having a proportion of butyl acrylate of at least 80% by weight, based on the weight of the first shell.

Shell 2: Polymer having a proportion of methyl methacrylate of at least 90% by weight, based on the weight of the second shell.

For example, a preferred acrylate rubber modifier may have the following composition:

Core: Copolymer of methyl methacrylate (95.7% by weight), ethyl acrylate (4% by weight) and allyl methacrylate (0.3% by weight)

S1: Copolymer of butyl acrylate (81.2% by weight), styrene (17.5% by weight) and allyl methacrylate (1.3% by weight)

S2: Copolymer of methyl methacrylate (96% by weight) and ethyl acrylate (4% by weight)

The ratio of core to shell(s) of the acrylate rubber modifier may vary within wide ranges. Preferably, the weight ratio of core to shell C/S is in the range of 20:80 to 80:20, preferably of 30:70 to 70:30, in the case of modifiers having one shell or the ratio of core to shell 1 to shell 2 C/S1/S2 is in the range of 10:80:10 to 40:20:40, particularly preferably of 20:60:20 to 30:40:30, in the case of modifiers having two shells.

The particle size of the acrylate rubber modifiers is usually in the range of 50 to 1000 nm, preferably 100 to 500 nm and particularly preferably 150 to 450 nm, without any limitation being intended thereby.

According to a particular aspect of the present invention, the weight ratio of silicone rubber graft copolymer to acrylate rubber modifier is in the range of 1:10 to 10:1, preferably of 4:6 to 6:4.

Particular moulding materials consist of
f1) 20 to 95% by weight of poly(meth)acrylates,
f2) 0 to 45% by weight of styrene-acrylonitrile polymers,
f3) 5 to 60% by weight of silicone rubber graft copolymers
f4) 0 to 60% by weight of impact modifiers based on acrylate rubber,
based in each case on the weight of the components f1 to f4, and customary additives and compounding materials.

In addition, the compositions to be polymerized, the moulding materials according to the invention or the mouldings obtainable therefrom may contain further widely known additives. These additives include, inter alia, molecular weight regulators, release agents, antistatic agents, antioxidants, demoulding agents, flameproofing agents, lubricants, dyes, flow improvers, fillers, light stabilizers, pigments, antiweathering agents and plasticizers.

The additives are used in customary amounts, i.e. up to 80% by weight, preferably up to 30% by weight, based on the total mass. If the amount is greater than 80% by weight, based on the total mass, properties of the plastics, such as, for example, the processability, may be disturbed.

The weight average molecular weight $M_w$ of the homo- and/or copolymers to be used according to the invention as matrix polymers may vary within wide ranges, the molecular weight usually being tailored to the intended use and the method of processing of the moulding material. In general, however, it is in the range between 20 000 and 1 000 000 g/mol, preferably 50 000 to 500 000 g/mol and particularly preferably 80 000 to 300 000 g/mol, without any limitation being intended thereby.

The thickness of the coating is often dependent on the type of reactive mixture and the moulding. The production of very thin coatings is often technically very demanding. On the other hand, very thick coatings frequently have a strong tendency to cracking, the adhesive strength decreasing in some cases. Coated mouldings whose coating preferably has a thickness in the range of 1 μm to 100 μm, preferably 5 μm to 75 μm, particularly preferably 8 μm to 50 μm, especially preferably 10 μm to 40 μm and very particularly preferably 15 μm to 30 μm are therefore of particular interest. The thickness of the coating can be adjusted via the size of the space between that surface of the moulding which is to be coated and the inner surface of the injection mould.

The temperature at which the moulding material is injected into the injection mould depends in particular on the type of polymer and of the additives. These processing temperatures are known to the person skilled in the art. In general, the moulding material is injected into the injection mould at a temperature in the range of 150 to 350° C., preferably 220 to 330° C.

The temperature of the mould can also be adjusted to the temperature customary for the respective moulding material. The moulding material can preferably be cooled to a temperature in the range of 40 to 160° C., particularly preferably 70 to 150° C. and very particularly preferably 60 to 80° C. before the reactive mixture is injected into the space.

The temperature at which the thermal curing of the reactive mixture is effected is dependent on the type of thermal initiator. In particular, processes in which the thermal curing is preferably effected at a temperature in the range of 70 to 160° C., preferably 80 to 130° C., particularly preferably in the range 85 to 120° C. and very particularly preferably in the range 90 to 110° C. in the injection mould are of particular interest. If the temperature during the thermal curing is too high, the formation of cracks may occur after UV irradiation. In the case of temperatures which are too low, the coating often shows an excessively high adhesion to the metal of the injection mould, it also being possible in some cases to improve the scratch resistance by a higher temperature during the thermal curing. The ranges described above have proved to be particularly expedient, without any limitation intended thereby.

According to a particular embodiment, the reactive mixture can be effected, for example, at a temperature in the range of 70 to 85° C., preferably in the range of 75 to 80° C. This embodiment is particularly advantageous if the reactive mixture comprises a particularly high proportion of compounds having at least four double bonds, for example of pentaerythrityl tetra(meth)acrylate. According to a further development of the process according to the invention, the reactive mixture can be cured at a temperature in the range of 85° C. to 120° C., preferably in the range of 90° C. to 110° C. This embodiment is particularly advantageous if the reactive mixture comprises a particularly high proportion of compounds having two or three double bonds, such as, for example, 1,6-hexanediol di(meth)-acrylate.

The reactive mixture can be cured at the same temperature at which the injection moulding is cooled in the mould. The beginning and the rate of the polymerization (curing) of the reactive mixture can be adjusted thereby by the choice of the type and of the proportion of thermal initiator and by the choice of the mould temperature. In addition, the beginning of curing can be controlled by the choice of the polyfunctional (meth)acrylates present in the reactive mixture.

After the thermal curing, the precured reactive mixture can be cured by irradiation at a temperature in the range of 0° C. to 120° C., preferably 10° C. to 40° C. Customary radiation sources can be used for this purpose, depending on the type of initiator. The curing can preferably be effected in particular by UV radiation, it being possible for the wavelength of the radiation source used to be in particular in the range of 100 nm to 500 nm, preferably 200 to 400 nm.

The present invention provides in particular novel coated mouldings which have an outstanding property profile and can therefore be used for a variety of applications. The present invention accordingly furthermore relates to coated mouldings comprising a moulding which is obtainable by injection moulding processes and comprises at least one polymer selected from the group consisting of polymethyl methacrylate, polymethylmethacrylimide, styrene-acrylonitrile copolymer, styrene-maleic acid copolymer and polymethyl methacrylate copolymers and a coating which is obtainable by polymerization of (meth)acrylates having at least two double bonds.

The moulding is distinguished in particular by high scratch resistance, which can be determined, for example, by an abrasive disc test. Especially coated, transparent mouldings whose haze value after a scratch resistance test according to ASTM 1044 (12/05) (applied weight 500 g, number of cycles=100) increases by not more than 10%, particularly preferably by not more than 6% and very particularly preferably by not more than 3% are of particular interest. The scratch resistance according to ASTM 1044 (12/05) (applied weight 500 g, number of cycles=100) can moreover be measured by the decrease in gloss at 20°. Here, preferred coated mouldings show a decrease of gloss at 20° after a scratch resistance test according to ASTM 1044 (12/05) (applied weight 500 g, number of cycles=100) of not more than 10%, particularly preferably by not more than 6% and very particularly preferably by not more than 3%. The decrease in gloss at 20° C. can be determined according to DIN EN ISO 2813. By determining a change of gloss, for example, the scratch resistance of coloured mouldings or of coloured coatings can be measured.

In addition, the mouldings according to the invention show outstanding adhesive strength of the coating which can be investigated according to the cross hatch test. For this purpose, the coating is scored crosswise and thus divided into chessboard-like individual segments. In general, at least 20 individual segments, preferably at least 25 individual segments, are formed thereby. Here, the spacing between the lines is about 1 mm. A 25 mm wide adhesive tape is then stuck on and peeled off again. The force required to release the adhesive tape per cm$^2$, measured according to DIN EN ISO 2409, is about 10 N per 25 mm width. For carrying out the test, for example, an adhesive tape which is obtainable under the trade name type 4104 from Tesa can be used. The coated mouldings preferably achieve a rating according to the cross hatch test of not more than 1, particularly preferably of 0. The coated mouldings achieve a rating of 1 if not substantially more than 5% of the individual segments are detached. If none of the individual segments (0%) is detached, the coated mouldings achieve a rating of 0.

In addition, preferred coatings are free of cracks and show high resistance to chemicals. Thus, the coatings resist in particular ethanol, ethanol/water (70/30), petrol, pancreatin and sulphuric acid (1% strength), no stress cracks being formed through contact with these compounds.

Preferred mouldings may have a modulus of elasticity greater than or equal to 1200 MPa, preferably greater than or equal to 1600 MPa, according to ISO 527 (at 1 mm/min). Furthermore, mouldings according to the invention may exhibit a Charpy impact strength greater than or equal to 10 kJ/m$^2$, preferably greater than or equal to 15 kJ/m$^2$, according to ISO179.

In addition, plastics having tensile strengths greater than or equal to 55, preferably greater than or equal to 60, according to DIN 53 455-1-3 (at 1 mm/min), can be produced, which plastics have excellent scratch resistance.

It is particularly surprising that this scratch-resistant moulding may have a transmittance $\tau_{D65} \geq 88\%$, preferably $\geq 90\%$, according to DIN 5036 Part 3. No limitation of the invention is intended by the abovementioned mechanical and/or optical properties of the moulding. Rather, these data serve for illustrating the particularly outstanding properties of the moulding which can be achieved in combination with good scratch resistance.

Furthermore, the mouldings of the present invention may show excellent stability to weathering. Thus, the stability to weathering according to the xenon arc test is preferably at least 1000 hours, particularly preferably at least 2000 hours. This stability can be determined, for example, by a slight decrease of the transmittance or by a slight decrease of the scratch resistance. Especially coated mouldings whose transmittance after exposure to a xenon arc for 2000 hours decreases by not more than 10%, particularly preferably by not more than 5%, based on the transmittance value at the beginning of the irradiation, are of particular interest. In addition, preferred mouldings may show an increase in the haze value after a scratch resistance test according to ASTM 1044 (12/05) (applied weight 500 g, number of cycles=100) to not more than 25%, particularly preferably to not more than 15%, after exposure to a xenon arc for 2000 hours. Furthermore, the determination of the scratch resistance after exposure to a xenon arc is also possible via the decrease in the gloss. Here, preferred coated mouldings show a decrease in the gloss at 20° after a scratch resistance test according to ASTM 1044 (12/05) (applied weight 500 g, number of cycles=100) of not more than 25%, particularly preferably by not more than 20% and very particularly preferably by not more than 15% after exposure to a xenon arc for 2000 hours.

In addition, preferred coatings which were obtained using a coating material according to the invention show high resistance in an alternating climate test, only slight cracking occurring in spite of deformation of the base body. The loading programme shown in FIG. 1 can preferably be used for carrying out the alternating climate test (BMW PR 303—part d).

Below, the present invention is to be explained with reference to examples and comparative examples without any limitation being intended thereby.

Comparative Example 1

In a small-scale experiment, the efficiency of the present reactive mixtures was investigated. For this purpose, an injection moulding (200×100×3 mm) was first produced from a PMMA moulding material (8N, commercially available from Röhm GmbH) and preheated to 85° C. For the preheating, the injection moulding was placed between two metal cylinders (having high gloss), the lower cylinder having a diameter of 150 mm and the upper metal cylinder a diameter of 120 mm. In order to prevent excessive cooling of the upper metal cylinder, the latter, was taken down after thermostating of the injection moulding for about 5 minutes, placed alongside the hotplate and further heated (thermostated at 85° C.). In the meantime, the injection moulding remained lying flat on the large metal cylinder and was further heated again for 5 minutes without weighting.

Thereafter (after thermostating of the injection moulding for 10 minutes), 1.5 g of reactive mixture which comprised 68.60% by weight of 1,6-hexanediol diacrylate, 29.40% by weight of trimethylolpropane triacrylate, 1% by weight of bis(4-tert-butylcyclo-hexyl) peroxydicarbonate (thermal initiator) and 1% by weight of 1-benzoylcyclohexanol (®Irgacure 184) was added to the injection moulding and the reaction solution was weighted (pressed) immediately with a small metal cylinder at 85° C. The coating was then allowed to cure for 60 sec, the reaction beginning about 15 seconds after the small metal cylinder had been placed on top. This could be measured on the basis of emerging reaction solution. A crack-free coating was obtained.

The scratch resistance of the coating was investigated in a small-scale test using steel wool, a scale of 0 (very high scratch resistance) to 7 (very low scratch resistance) being used. The coating thus obtained achieved a scratch resistance of 6 (low scratch resistance).

Example 1

Comparative Example 1 was substantially repeated, but curing was effected by UV irradiation after the thermal curing of the coated injection moulding. The coating remained free of cracks. The scratch resistance of the coating was investigated in a small-scale test using steel wool, the coating thus obtained achieving a scratch resistance of 3 (good scratch resistance).

Comparative Example 2

Comparative Example 1 was substantially repeated, but a reactive mixture which comprised 67.90% by weight of 1,6-hexanediol diacrylate, 29.10% by weight of trimethylolpropane triacrylate, 1% by weight of bis(4-tert-butylcyclohexyl) peroxydicarbonate (thermal initiator) and 2% by weight of benzoylcyclohexanol (®Irgacure 184) was used.

The scratch resistance of the coating was investigated in a small-scale test using steel wool, the coating thus obtained achieving a scratch resistance of 6 (low scratch resistance).

Example 2

Comparative Example 2 was substantially repeated, but curing by UV irradiation was effected after the thermal curing of the coated injection moulding. The coating remained free of cracks. The scratch resistance of the coating was investigated in a small-scale test using steel wool, the coating thus obtained achieving a scratch resistance of 3 (good scratch resistance).

Example 3

Example 1 was substantially repeated, but a reactive mixture which comprised 97.75% by weight of trimethylolpropane triacrylate, 0.25% by weight of bis(4-tert-butylcyclohexyl) peroxydicarbonate (thermal initiator) and 2% by weight of 1-benzoylcyclohexanol (®Irgacure 184) was used.

The thermal curing reaction began after about 15 seconds. After the UV curing, a crack-free coating which had a thickness of about 20 μm (average value of four individual measurements) was obtained.

The scratch resistance of the coating was investigated in a small-scale test using steel wool, the coating thus obtained achieving a scratch resistance of 1 (very good scratch resistance).

Example 4

Example 3 was substantially repeated, but the reaction temperature was reduced from 85° C. to 80° C.

The thermal curing reaction began after about 25 seconds. After the UV curing, a crack-free coating which had a thickness of about 25 μm (average value of four individual measurements) was obtained.

The scratch resistance of the coating was investigated in a small-scale test using steel wool, the coating thus obtained achieving a scratch resistance of 1 (very good scratch resistance).

Example 5

Example 4 was substantially repeated, but a reactive mixture which comprised 97.50% by weight of trimethylolpropane triacrylate, 0.50% by weight of bis(4-tert-butylcyclohexyl) peroxydicarbonate (thermal initiator) and 2% by weight of 1-benzoylcyclohexanol (®Irgacure 184) was used.

The thermal curing reaction began after about 15 seconds. After the UV curing, a crack-free coating which had a thickness of about 12 μm (average value of four individual measurements) was obtained.

The scratch resistance of the coating was investigated in a small-scale test using steel wool, the coating thus obtained having a scratch resistance of 1 (very good scratch resistance).

Example 6

Example 4 was substantially repeated, but a reactive mixture which comprised 97.00% by weight of trimethylolpropane triacrylate, 1.00% by weight of bis(4-tert-butylcyclohexyl) peroxydicarbonate (thermal initiator) and 2% by weight of 1-benzoylcyclohexanol (®Irgacure 184) was used.

The thermal curing reaction began after about 8 seconds. After the UV curing, a crack-free coating which had a thickness of about 13 µm (average value of four individual measurements) was obtained.

The scratch resistance of the coating was investigated in a small-scale test using steel wool, the coating thus obtained having a scratch resistance of 1 (very good scratch resistance).

Example 7

Example 4 was substantially repeated, but a reactive mixture which comprised 9 g of trimethylolpropane triacrylate, 1 g of pentaerythrityl tetraacrylate, 0.05 g of bis(4-tert-butyl-cyclohexyl) peroxydicarbonate (thermal initiator) and 0.20 g of 1-benzoylcyclohexanol (®Irgacure 184) was used.

After the UV curing, a crack-free coating which had a thickness of about 27 µm (average value of four individual measurements) was obtained.

The scratch resistance of the coating was investigated in a small-scale test using steel wool, the coating thus obtained having a scratch resistance of about 0.5 (very good scratch resistance).

Example 8

Example 7 was substantially repeated, but a reactive mixture which comprised 8 g of trimethylolpropane triacrylate, 2 g of pentaerythrityl tetraacrylate, 0.05 g of bis(4-tert-butyl-cyclohexyl) peroxydicarbonate (thermal initiator) and 0.20 g of 1-benzoylcyclohexanol (®Irgacure 184) was used.

After the UV curing, a crack-free coating which had a thickness of about 14 µm (average value of four individual measurements) was obtained.

The scratch resistance of the coating was investigated in a small-scale test using steel wool, the coating thus obtained having a scratch resistance of about 0 (excellent scratch resistance; no scratches could be produced by muscle power).

Example 9

Example 7 was substantially repeated, but a reactive mixture which comprised 5 g of trimethylolpropane triacrylate, 5 g of pentaerythrityl tetraacrylate, 0.05 g of bis(4-tert-butyl-cyclohexyl) peroxydicarbonate (thermal initiator) and 0.20 g of 1-benzoylcyclohexanol (®Irgacure 184) was used.

After the UV curing, a crack-free coating which had a thickness of about 16 µm (average value of four individual measurements) was obtained.

The scratch resistance of the coating was investigated in a small-scale test using steel wool, the coating thus obtained having a scratch resistance of 0 (excellent scratch resistance; no scratches could be produced by muscle power).

Example 10

Example 7 was substantially repeated, but a reactive mixture which comprised 3 g of trimethylolpropane triacrylate, 7 g of pentaerythrityl tetraacrylate, 0.025 g of bis(4-tert-butyl-cyclohexyl) peroxy-dicarbonate (thermal initiator) and 0.20 g of 1-benzoylcyclohexanol (®Irgacure 184) was used.

The thermal curing was effected at 85° C., a curing time of about 30 seconds being sufficient. After the UV curing, a crack-free coating was obtained.

The scratch resistance of the coating was investigated in a small-scale test using steel wool, the coating thus obtained achieving a scratch resistance of 0 (excellent scratch resistance).

Example 11

In a small-scale experiment, the efficiency of the present reactive mixtures was investigated. For this purpose, an injection moulding (200×100×3 mm) was first produced from a PMMA moulding material (8N, commercially available from Röhm GmbH) and preheated to 85° C. For the preheating, the injection moulding was placed between two metal cylinders (having high gloss), the lower cylinder having a diameter of 150 mm and the upper metal cylinder a diameter of 120 mm. In order to prevent excessive cooling of the upper metal cylinder, the latter, was taken down after thermostating of the injection moulding for about 5 minutes, placed alongside the hotplate and further heated (thermostated at 85° C.). In the meantime, the injection moulding remained lying flat on the large metal cylinder and was further heated again for 5 minutes without weighting.

Thereafter (after thermostating the injection moulding for 10 minutes), 1.5 g of a reactive mixture which comprised 5 g of trimethylolpropane triacrylate, 5 g of pentaerythrityl tetraacrylate, 0.025 g of bis(4-tert-butylcyclohexyl) peroxydicarbonate (thermal initiator) and 0.20 g of 1-benzoylcyclo-hexanol (®Irgacure 184) was added to the injection moulding and the reaction solution was immediately weighted (pressed) with a small metal cylinder at 85° C. and a metal block weighing 3 kg. The coating was then allowed to cure for 30 seconds. A crack-free coating was obtained.

After the thermal curing, the coated injection moulding was cured by UV irradiation. Here, the cooled coating was exposed to UV light for about 1 minute without nitrogen. A crack-free, 20 µm thick coating was obtained. The scratch resistance of the coating was investigated in a small-scale test using steel wool, the coating thus obtained achieving a scratch resistance of 0 (excellent scratch resistance).

Example 12

Example 11 was substantially repeated, but a layer thickness of 80 µm was produced. For this purpose, the injection moulding was covered with a polyester film which had been cut out in annular form and had a thickness of about 80 µm.

After the thermal curing, an initially crack-free coating was obtained. As a result of exposure to UV light, however, substantial cracking occurred. The scratch resistance of the coating was investigated in a small-scale test using steel wool, the coating thus obtained having a scratch resistance of 0 (excellent scratch resistance).

Example 13

In a small-scale experiment, the efficiency of the present reactive mixtures was investigated. For this purpose, an injection moulding (200×100×3 mm) was first produced from a PMMA moulding material (8N, commercially available from Röhm GmbH) and preheated to 85° C. For the preheating, the injection moulding was placed between two metal blocks (having high gloss), which had a size of 170·170·27 mm. In order to prevent excessive cooling of the upper metal block, the latter, was taken down after thermostating of the injection moulding for about 5 minutes, placed alongside the hotplate and further heated (thermostated at 85° C.). In the meantime, the injection moulding remained lying flat on the lower metal block and was further heated again for 5 minutes without weighting.

Thereafter (after thermostating the injection moulding for 10 minutes), 1.5 g of a reactive mixture which comprised 5 g of trimethylolpropane triacrylate, 5 g of pentaerythrityl tetraacrylate, 0.05 g of bis(4-tert-butylcyclohexyl) peroxydicarbonate (thermal initiator) and 0.20 g of 1-benzoylcyclohexanol (®Irgacure 184) was added to the injection moulding and the reaction solution was immediately pressed with the upper metal block at 85° C. The coating was then allowed to cure for 60 seconds. A crack-free coating was obtained.

After the thermal curing, the coated injection moulding was cured by UV irradiation. Here, the cooled coating was exposed to UV light for about 1 minute without nitrogen. A crack-free coating was obtained.

The scratch resistance of the coating was investigated by an abrasive disc test according to ASTM 1044 (12/05) (applied weight 500 g, number of cycles=100). The haze of the moulding increased to 2.8% thereby. Furthermore, the adhesive strength of the coating was determined by means of a cross hatch test. For this purpose, the coating was scored crosswise and thus divided into chessboard-like individual segments. The spacing between the lines is about 1 mm here. An adhesive tape is then stuck on and peeled off again. For carrying out the test, an adhesive tape which is available under the tradename Type 4104 from Tesa was used. The adhesive strength of the coating was so high that no individual segment was detached.

Example 14

Example 13 was substantially repeated, but a reactive mixture which comprised 10 g of trimethylolpropane triacrylate, 0.05 g of bis(4-tert-butylcyclohexyl) peroxydicarbonate (thermal initiator) and 0.20 g of 1-benzoylcyclohexanol (®Irgacure 184) was used.

The scratch resistance of the coating was investigated by an abrasive disc test according to ASTM 1044 (12/05) (applied weight 500 g, number of cycles=100). The haze of the moulding increased to 5.4% thereby. Furthermore, the adhesive strength of the coating was determined by means of a cross hatch test. For this purpose, the coating was scored crosswise and thus divided into chessboard-like individual segments. The spacing between the lines is about 1 mm here. An adhesive tape is then stuck on and peeled off again. For carrying out the test, an adhesive tape which is available under the tradename Type 4104 from Tesa was used. The adhesive strength of the coating was so high that no individual segment was detached.

Furthermore, a moulding thus produced was subjected to an alternating climate test according to (BMW PR 303—part d), the loading programme being shown in FIG. 1. The moulding was greatly deformed by this test, but the coating showed only very slight cracking.

In addition, a moulding thus produced was irradiated with xenon arc light for 2000 hours (according to DIN EN ISO 4892, part 2, xenon arc tester: Atlas/Heraeus type 1200), with the result that the transmittance decreased only from 91.8% to 91.1%. The scratch resistance of the coating was likewise slightly adversely affected by the xenon arc test. The haze of the moulding increased from 5.4% to 22.3%.

Example 15

Example 13 was substantially repeated, but a reactive mixture which comprised 5 g of trimethylolpropane triacrylate, 5 g of 1,6-hexanediol diacrylate, 0.05 g of bis(4-tert-butylcyclohexyl) peroxydicarbonate (thermal initiator) and 0.20 g of 1-benzoylcyclohexanol (®Irgacure 184) was used.

The scratch resistance of the coating was investigated by an abrasive disc test according to ASTM 1044 (12/05) (applied weight 500 g, number of cycles=100). The haze of the moulding increased to 5.8% thereby. Furthermore, the adhesive strength of the coating was determined by means of a cross hatch test. For this purpose, the coating was scored crosswise and thus divided into chessboard-like individual segments. The spacing between the lines is about 1 mm here. An adhesive tape is then stuck on and peeled off again. For carrying out the test, an adhesive tape which is available under the tradename Type 4104 from Tesa was used. The adhesive strength of the coating was so high that no individual segment was detached.

Furthermore, a moulding thus produced was subjected to an alternating climate test according to (BMW PR 303—part d), the loading programme being shown in FIG. 1. The moulding was greatly deformed by this test, but the coating showed no cracking.

In addition, a moulding thus produced was irradiated with xenon arc light for 2000 hours (according to DIN EN ISO 4892, part 2, xenon arc tester: Atlas/Heraeus type 1200), with the result that the transmittance decreased only from 91.4% to 91.1%. The scratch resistance of the coating was likewise slightly adversely affected by the xenon arc test. The haze of the moulding increased from 5.8% to 13.5%.

Example 16

Example 13 was substantially repeated, but a reactive mixture which comprised 7.2 g of trimethylolpropane triacrylate, 1.8 g of 1,6-hexanediol diacrylate, 1.0 g of polysiloxane (lubricant; RC 725, commercially available from Goldschmidt GmbH), 0.1 g of bis(4-tert-butylcyclohexyl) peroxydicarbonate (thermal initiator) and 0.20 g of 1-benzoylcyclohexanol (®Irgacure 184) was used. In addition, a PMMA moulding material coloured black (8N black 90084, commercially available from Röhm GmbH) was used.

The thermal curing was effected at 90° C., a curing time of about 60 seconds being sufficient. After the UV curing, a crack-free coating was obtained.

The scratch resistance of the coating was investigated by an abrasive disc test according to ASTM 1044 (12/05), (applied weight 500 g, number of cycles=100). A decrease in the gloss at 20° according to DIN EN ISO 2813 of 6.8% was obtained thereby.

Example 17

Example 16 was substantially repeated, but the reaction temperature was increased from 90° C. to 95° C.

The scratch resistance of the coating was investigated by an abrasive disc test according to ASTM 1044 (12/05) (applied weight 500 g, number of cycles=100). A decrease in the gloss at 20° according to DIN EN ISO 2813 of 5.3% was obtained thereby.

Example 18

Example 15 was substantially repeated, but a reactive mixture which comprised 5 g of trimethylolpropane triacrylate, 5 g of 1,6-hexanediol diacrylate, 0.1 g of bis(4-tert-butylcyclohexyl) peroxydicarbonate (thermal initiator) and 0.20 g of 1-benzoylcyclohexanol (®Irgacure 184) was used. In addition, a PMMA moulding material coloured black (8N black 90084, commercially available from Röhm GmbH) was used.

The thermal curing was effected at 90° C., a curing time of about 30 seconds being sufficient. After the UV curing, a crack-free coating was obtained.

The scratch resistance of the coating was investigated by an abrasive disc test according to ASTM 1044 (12/05) (applied weight 500 g, number of cycles=100). A decrease in the gloss at 20° according to DIN EN ISO 2813 of 4.7% was obtained thereby.

Furthermore, a moulding thus produced was subjected to an alternating climate test according to (BMW PR 303—part d), the loading programme being shown in FIG. 1. The moulding was greatly deformed by this test, but the coating showed no cracking.

Example 19

Example 18 was substantially repeated, but a reactive mixture which comprised 7 g of trimethylolpropane triacrylate, 3 g of 1,6-hexanediol diacrylate, 0.1 g of bis(4-tert-butylcyclohexyl) peroxydicarbonate (thermal initiator) and 0.20 g of 1-benzoylcyclohexanol (®Irgacure 184) was used.

The thermal curing was effected at 90° C., a curing time of about 60 seconds being sufficient. After the UV curing, a crack-free coating was obtained.

The scratch resistance of the coating was investigated by an abrasive disc test according to ASTM 1044 (12/05) (applied weight 500 g, number of cycles=100). A decrease in the gloss at 20° according to DIN EN ISO 2813 of 1.8% was obtained thereby.

Furthermore, a moulding thus produced was subjected to an alternating climate test according to (BMW PR 303—part d), the loading programme being shown in FIG. 1. The moulding was greatly deformed by this test, but the coating showed no cracking.

The invention claimed is:

1. A process for the production of coated mouldings, the process comprising injecting a moulding material into an injection mould and cooling to produce a moulding, wherein the injection mould is changed so that a space forms between a surface of the moulding which is to be coated and an inner surface of the injection mould, the resulting space is filled by injection moulding with a reactive mixture comprising at least 40% by weight of (meth)acrylates having at least two double bonds, at least one photoinitiator and at least one thermal initiator, and the reactive mixture is first thermally cured and, after the thermal curing, cured by irradiation.

2. The process according to claim 1, wherein the moulding material comprises at least one polymer selected from the group consisting of polymethyl methacrylate, polymethylmethacrylimide, styrene-acrylonitrile copolymer, styrene-maleic acid copolymer and polymethyl methacrylate copolymers.

3. The process according to claim 2, wherein the moulding material comprises at least 50% by weight of polymethyl methacrylate, polymethyl methacrylimide and/or polymethyl methacrylate copolymers.

4. The process according to claim 1, wherein the thickness of the coating is in the range of 5 μm to 75 μm.

5. The process according to claim 1, wherein the moulding material is injected into the injection mould at a temperature in the range of 220 to 330° C.

6. The process according to claim 1, wherein the moulding material is cooled to a temperature in the range of 70 to 150° C. before the reactive mixture is injected into the space.

7. The process according to claim 1, wherein the reactive mixture is thermally cured at a temperature in the range of 80 to 130° C. in the injection mould.

8. The process according to claim 1, wherein the thermally cured reactive mixture is cured by irradiation at a temperature in the range of 10 to 40° C.

9. The process according to claim 8, wherein the thermally cured reactive mixture is cured using UV radiation.

10. The process according to claim 1, wherein the reactive mixture comprises at least 60% by weight of (meth)acrylates having at least two double bonds.

11. The process according to claim 1, wherein the reactive mixture comprises at least one (meth)acrylate having three or more double bonds.

12. The process according to claim 11, wherein the proportion of (meth)acrylates having three or more double bonds is at least 25% by weight, based on the weight of the reactive mixture.

13. The process according to claim 12, wherein the proportion of (meth)acrylates having three or more double bonds is at least 50% by weight, based on the weight of the reactive mixture.

14. The process according to claim 1, wherein the reactive mixture comprises not more than 75% by weight of monomers having two or less double bonds.

15. The process according to claim 1, wherein the reactive mixture has a dynamic viscosity in the range of 1 to 200 mPa·s at 25° C.

16. The process according to claim 1, wherein the reactive mixture comprises 0.01% by weight to 3% by weight of photoinitiator, based on the weight of the reactive mixture.

17. The process according to claim 1, wherein the reactive mixture comprises 0.03% by weight to 5% by weight of thermal initiator, based on the weight of the reactive mixture.

18. The process according to claim 1, wherein the weight ratio of photo initiator to thermal initiator is in the range of 20:1 to 1:5.

19. The process according to claim 1, wherein the reactive mixture comprises 1,6-hexanediol diacrylate, trimethylolpropane triacrylate and/or pentaerythrityl tetraacrylate.

20. The process according to claim 19, wherein the reactive mixture comprises trimethylolpropane triacrylate and 1,6-hexanediol diacrylate, the weight ratio of trimethylolpropane triacrylate to 1,6-hexanediol diacrylate being in the range of 5:1 to 1:5.

21. The process according to claim 19, wherein the reactive mixture comprises trimethylolpropane triacrylate and pentaerythrityl tetraacrylate, the weight ratio of trimethylolpropane triacrylate to pentaerythrityl tetraacrylate being in the range of 5:1 to 1:5.

22. The process according to claim 19, wherein the reactive mixture comprises pentaerythrityl tetraacrylate and 1,6-hexanediol diacrylate, the weight ratio of pentaerythrityl tetraacrylate to 1,6-hexanediol diacrylate being in the range of 5:1 to 1:5.

23. The process according to claim 1, wherein the reactive mixture comprises a lubricant.

24. The process according to claim 1, wherein the reactive mixture comprises colorants, metallic pigments, UV stabilizers, fillers or nanomaterials.

25. The process according to claim 1, wherein the reactive mixture comprises at least 90% by weight of (meth)acrylates having at least two double bonds.

* * * * *